(12) United States Patent  (10) Patent No.: US 7,686,133 B2
Caudill  (45) Date of Patent: Mar. 30, 2010

(54) BOARDING LADDER APPARATUS FOR MOBILE EQUIPMENT

(75) Inventor: James R. Caudill, Lacrosse, IN (US)

(73) Assignee: Edw. C. Levy Co., Detroit, MI (US)

( * ) Notice: Subject to any disclaimer, the term of this patent is extended or adjusted under 35 U.S.C. 154(b) by 157 days.

(21) Appl. No.: 11/280,687

(22) Filed: Nov. 16, 2005

(65) Prior Publication Data

US 2007/0119655 A1   May 31, 2007

Related U.S. Application Data

(60) Provisional application No. 60/628,984, filed on Nov. 18, 2004.

(51) Int. Cl.
*E06C 9/00*   (2006.01)
(52) U.S. Cl. .......................... 182/127; 182/91; 280/166
(58) Field of Classification Search ................ 182/127, 182/88–91, 97; 280/166
See application file for complete search history.

(56) References Cited

U.S. PATENT DOCUMENTS

| 2,566,401 | A | * | 9/1951 | Bustin | 182/89 |
| 2,702,195 | A | * | 2/1955 | Merrill | 182/89 |
| 3,083,785 | A | * | 4/1963 | Hyman | 182/89 |
| 3,313,374 | A | * | 4/1967 | Teach | 182/89 |
| 3,601,220 | A | * | 8/1971 | Saucier | 182/84 |
| 3,758,134 | A | * | 9/1973 | Stewart | 280/163 |
| 3,980,319 | A | * | 9/1976 | Kirkpatrick | 280/166 |
| 4,564,205 | A | * | 1/1986 | Shookman et al. | 280/166 |
| 5,046,582 | A | * | 9/1991 | Albrecht | 182/127 |
| 5,199,731 | A | * | 4/1993 | Martin | 280/166 |
| 5,538,269 | A | * | 7/1996 | McDaniel et al. | 280/166 |
| 5,897,125 | A | * | 4/1999 | Bundy | 280/166 |
| 6,000,496 | A | * | 12/1999 | Rinaldi | 182/127 |

* cited by examiner

*Primary Examiner*—Alvin C Chin-Shue
(74) *Attorney, Agent, or Firm*—Honigman Miller Schwartz and Cohn LLP

(57) ABSTRACT

An mobile equipment boarding ladder includes a pair of hinged mounting brackets attached to the mobile equipment at a first end. A ladder step is attached to the second ends of the hinged brackets via a pair of pivot mechanisms. The hinge pins and the pivot mechanisms are substantially parallel so that the entire ladder can fold and collapse against the side of the mobile equipment in response to an external force, such as an obstacle. The hinged brackets can be self-centering via gravity, a spring, or both. A pair of flexible straps are attached to the second end of the hinged brackets, and hang vertically from the brackets. A pair of lower pivot mechanisms and a lower step are attached to the lower end of the straps, oriented in the same manner as the first pivot mechanisms.

9 Claims, 3 Drawing Sheets

BOARDING LADDER APPARATUS FOR MOBILE EQUIPMENT

PRIORITY DATA

This application claims benefit of U.S. Provisional Patent Application Ser. No. 60/628,984 filed on Nov. 18, 2004, entitled "Snap Back Hinged Step Apparatus for Mobile Equipment" and is hereby incorporated by reference.

BACKGROUND OF THE INVENTION

1. Field of the Invention

The present invention relates to boarding steps and ladders for heavy equipment, such as earthmovers, and more specifically to an easy-to-use, flexible boarding ladder.

2. Description of the Related Art

Job sites are harsh environments for machinery, and place great demands on their structural integrity. Dust, rocks, and other hazards exact a toll on man and machine alike. Much has been accomplished to make the machines more capable and more durable than ever before, but there are numerous technical areas that need advancements. Ergonomics and human factors often clash with the realities of mechanical engineers as they strive to make good machines better. One of these areas relates to human ingress and egress from the machines, such as large dump trucks and loaders used in mining operations.

The cabs of those vehicles have advanced a long way from the early days, but the operators still need to climb up into the cab. Often, the path to the cab is quite dangerous. The most common ingress method is a metal ladder that is attached to the side of the vehicles. The ladders are quite functional, and serve their purpose on the most basic level. However, while these ladders are rigid and strong enough to withstand the weight and abuse of the vehicle operators, they are often damaged or destroyed by the conditions outside of the cab. A damaged ladder can make egress a dangerous proposition, particularly where the vehicle is very tall or the ground is uneven.

Ladders are typically oriented as close to the cab as is possible to provide a more direct route to the cab and to minimize the exposure of the operator to the hazardous conditions. On most vehicles, this means that the boarding ladder is quite close to a front wheel of the vehicle. While the vehicle is in motion, the turning wheels kick up rocks and debris, particularly at unimproved job sites. Mud flaps and rock guards are not really an option for a couple of reasons. Such guards could collect debris and interfere with the operation of the vehicle. Also, the guards would need to be prohibitively heavy and expensive to prevent their being damaged and becoming an impediment to vehicle operation. Another factor is that vehicle operators often make mistakes and run into things, such as rocks, buildings and other vehicles. The reality is that boarding ladders will remain exposed to the elements and harsh conditions. Another reality is that access systems require a degree of compromise between what is desirable and what is practicable.

Compared to large rocks and debris, boarding ladders are relatively flimsy, even when the bottom step is suspended from a steel cable, and it won't be long before it is bent, broken, or even knocked off. Thus, a flexible boarding ladder will last a lot longer than a rigid one. However, some flexible ladders, such as rope ladders, even using steel cable, can be difficult to climb, up or down. It is unacceptable for an operator to miss the step on a rope ladder and fall 4 or 6 feet to the ground. Remember, the objective of most companies is to get the job done, efficiently and without injuries. Some solutions have replaced the bottom six or so steps of a rigid boarding ladder with a hydraulically operated section that can be swung up out of harms way when the vehicle is in motion. Such devices are quite complex. They need to be linked to the vehicle's engine and controls so that the operator cannot drive away with the ladder in the down position, and they need to provide controls in both the cab and at the base of the ladder for ingress and egress. It is an expensive solution, compared with an ordinary ladder.

Therefore, there has been and continues to be a need for a boarding ladder with the damage-resistance and longevity of a flexible rope or cable ladder, and the sure-footed safety of a rigid boarding ladder.

SUMMARY OF THE DISCLOSURE

The device is an improved mobile equipment boarding ladder. It includes a pair of hinged mounting brackets attached to the mobile equipment at their first ends. A ladder step is attached to the second ends of the hinged brackets via a pair of pivot mechanisms. The hinge pins and the pivot mechanisms are substantially parallel so that the entire ladder can fold and collapse against the side of the mobile equipment in response to an external force, such as an obstacle. The hinged brackets are self-centering via gravity, a spring, or both. A pair of flexible straps are attached to the second end of the hinged brackets, and hang vertically from the brackets. A pair of lower pivot mechanisms and a lower step are attached to the lower end of the straps, oriented in the same manner as the first pivot mechanisms and ladder step.

DETAILED DESCRIPTION OF THE PREFERRED EMBODIMENT

The following detailed description is of the best presently contemplated modes of carrying out the invention. This description is not to be taken in a limiting sense, but is made merely for the purpose of illustrating general principles of embodiments of the invention.

The present invention provides an improved mobile equipment boarding ladder that is easy to use and resistant to damage.

Figure 1:
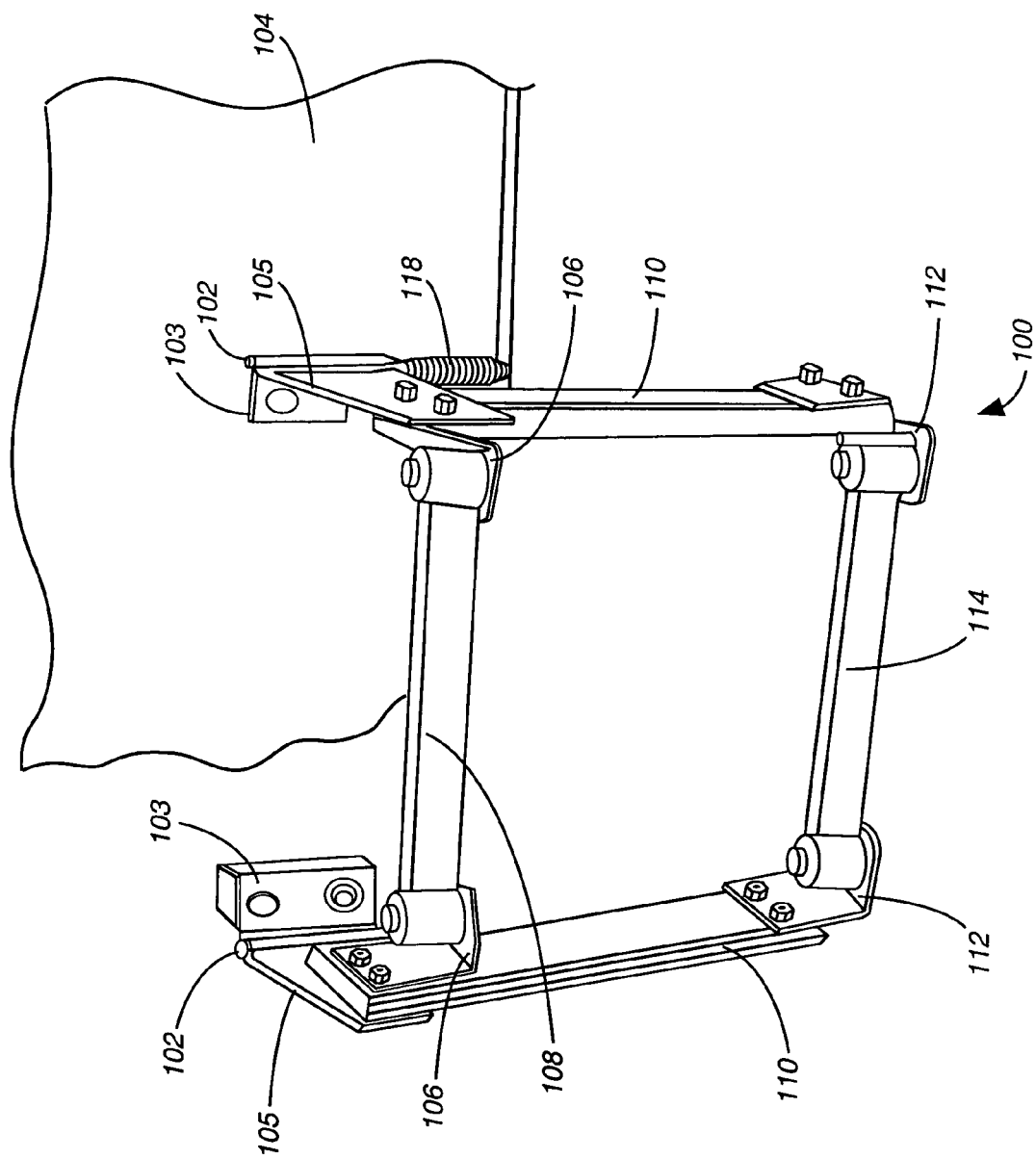
FIG. 1 is an environmental view of an improved mobile equipment boarding ladder, in accordance with the present invention.

FIG. 1 shows an environmental view of an improved mobile equipment boarding ladder 100. The boarding ladder 100 shown includes a pair of hinged mounting brackets 102. Each hinged bracket 102 has a mounting end 103 and a ladder end 105. The brackets 102 are attached to the mobile equipment 104 at their mounting ends 103. The hinged brackets 102 have a range of motion of about 180 degrees. Thus, the ladder ends 105 of the brackets 102 are able to lay flush against the mobile equipment 104 when fully deflected. A pair of upper pivot mechanisms 106 are attached to the ladder ends 105 of the brackets 102. An upper ladder step 108 is attached to each of the upper pivot mechanisms 106. The axes of the pivots 106 are substantially parallel to the pins within the hinged brackets 102. Thus, the step 108, in conjunction with the ladder ends 105 of the brackets 102, can fold flush against the mobile equipment 104 in response to an external force.

A pair of flexible straps 110 are attached to the ladder ends 105 of the hinged brackets 102. The straps 110 hang generally vertically from the brackets 102 and provide support for a pair of lower pivot mechanisms 112, which are attached to the lower terminal end of the straps 110. The lower pivot mechanisms 112 are oriented in the same manner as the upper pivot mechanisms 106. A lower ladder step 114 is attached to the 112 lower pivot mechanisms.

In one embodiment, the flexible straps 110 are a reinforced rubber material. One or more layers may be used. In another embodiment, the flexible straps 110 are a metal belt material. The metal belt may be made from multiple individual links or woven to form a broad, generally flat, belt. The flexible straps 110 are broad and generally flat to provide flexibility in one direction and to resist excessive flexion in other directions. This assures that the lower step 114 will be presented to the equipment operator in a stable, convenient position for ingress and egress.

Figure 2:
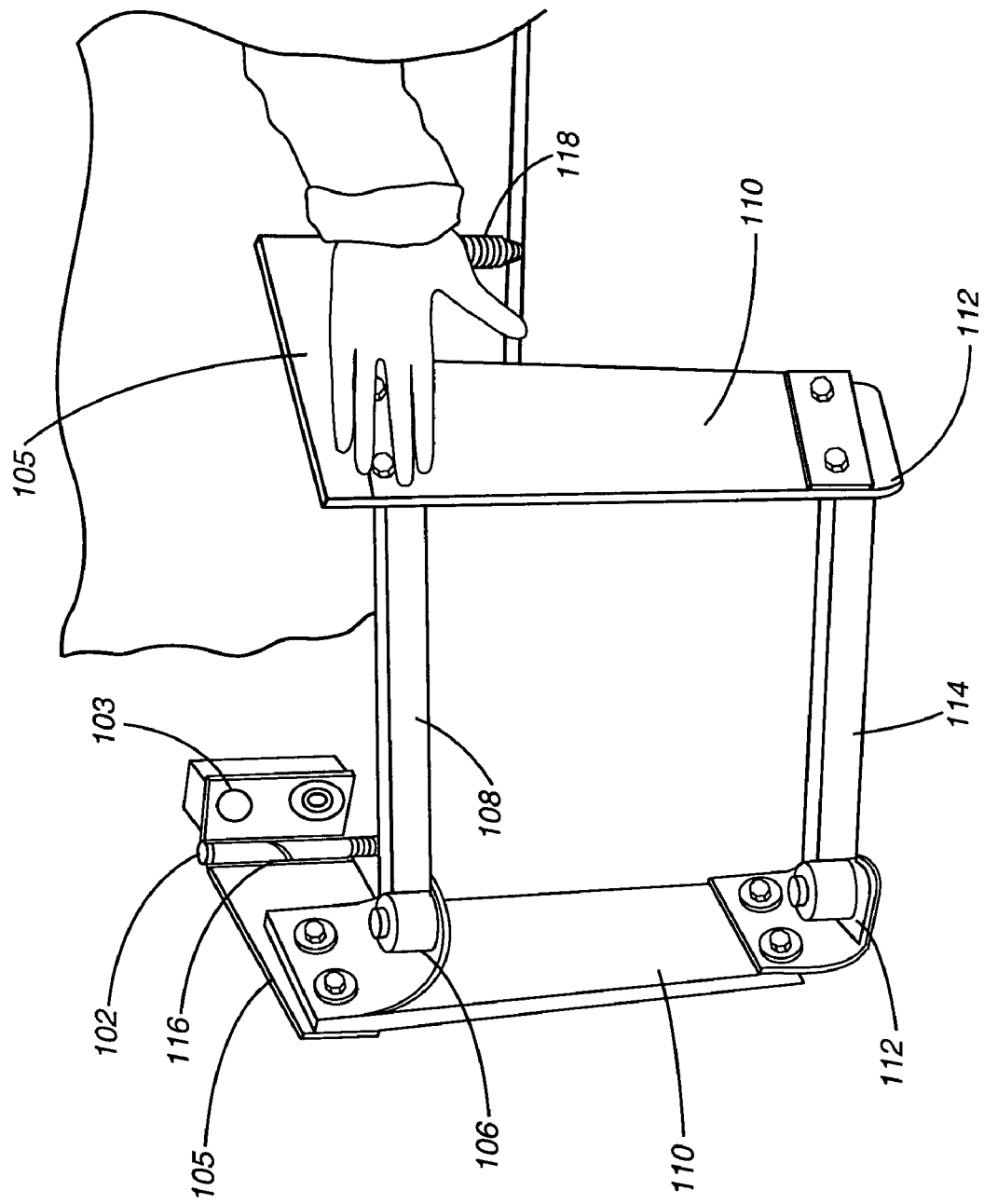
FIG. 2 is a perspective view of the improved mobile equipment boarding ladder, in accordance with the present invention.

FIG. 2 shows the mobile equipment boarding ladder 100 in a partially deflected position. The upper step 108 moves in unison with the brackets 102. The lower step 114 offers no resistance to the movement and generally mimics the position of the upper step 108, subject to any flexion of the flexible belts 110.

In one embodiment, one or both of the hinged brackets 102 automatically centers itself. When a bracket 102 is centered, it is generally perpendicular to the mobile equipment 104. There are several different ways to make a self-centering bracket 102. Gravity, springs, or a combination of the two may be used to center the bracket 102.

Where gravity is used, the brackets 102 are constructed with a cam or ramp 116 incorporated into the mating surfaces between the mounting end 103 and the ladder end 105 around an internal pivot pin. As the ladder end 105 is deflected, left or right, the ladder end 105 is pushed up the cam or ramp 116 and is raised slightly above its centered position. Removal of the external force allows gravity to force the ladder end 105 down and back to the centered position.

In another embodiment, an internal spring mechanism, such as a torsion spring, may be used to mechanically force the ladder end 105 into the centered position.

In another embodiment, the cam or ramp mechanism 116 is combined with a spring. In this embodiment, a compression spring 118 acts upon the internal pivot pin and the attached ladder end 105 of the bracket 102 to force the ladder end 105 into the centered position. As an external force deflects the ladder end 105 and raises it slightly, the lifting motion from the cam compresses the spring 118 to provide a restoring force. This arrangement is superior to either gravity or a spring alone. Other variations are possible as well.

Figure 3:
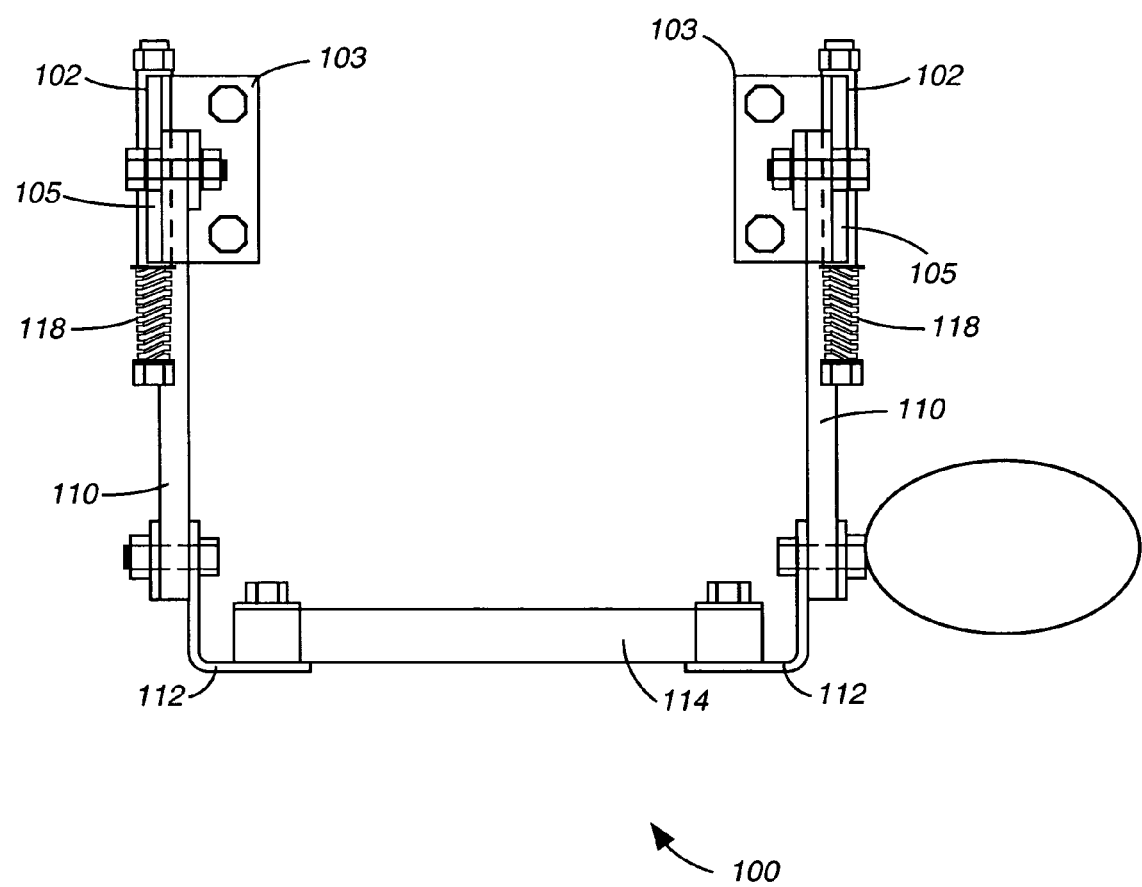
FIG. 3 is a side view of the improved mobile equipment boarding ladder, in accordance with the present invention.

FIG. 3 shows a boarding ladder that is constructed with only the lower pivots 112 and the lower step 114. The mounting ends 103 of the brackets 102 are attached to the mobile equipment. The compression springs 118 are clearly visible attached to the hinge pin in the brackets 102. The ladder ends 105 of the brackets 102 are seen from the edge. The flexible belts 110, which are attached to the flexible ends 105, are also seen from the edge. The flexible belts 110 are easily flexed to either side in response to an external force. Of course, a force that comes more from the front will fold the ladder ends 105 against the mobile equipment and thereby enable the boarding ladder 100 to flex and withstand the force without breaking.

Alternatively, the flexible straps 110 may be lengthened and several steps may be added below the lower step 114 for excessively high mobile equipment.

In normal use, the flexing and pivoting feature of the ladder will hardly be noticed by the equipment operator. The self-centering hinged bracket 102 keep the steps 108, 114 out as far away from the side of the mobile equipment as they will go, thus enabling easy access by the operator. However, if the ladder 100 encounters an external force, such as if a large rock is kicked up from a tire, or if another vehicle runs into the ladder 100, the ladder 100 will fold itself against the equipment 104, minimizing the profile of the ladder 100. Further, the lower step 114 is able to move somewhat independently, even if the upper step 108 is pinned against the equipment 104, due to the flexibility of the straps 110.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A ladder for a vehicle including a substantially vertical side, comprising:
   a ladder step; and
   means for pivotably-collapsing the ladder step flush against the substantially vertical side of the vehicle in response to an external force applied to the ladder step, wherein the means for collapsing includes
   a pair of pivot mechanisms, wherein one of each of the pair of pivot mechanisms are attached to respective ends of the ladder step; and
   a pair of hinged mounting brackets, wherein each of the hinged mounting brackets includes a ladder end pivotably-attached to a mounting end, wherein the mounting end is fixed to the substantially vertical side of the of the vehicle, wherein each of the ladder ends are pivotably-attached to the pair of pivot mechanisms, wherein each of the ladder ends of the pair of hinged mounting brackets are deflectable to the left or right to define a range of motion of about 180° to permit the ladder end of each bracket to lay flush against the substantially vertical side of the vehicle.

2. The ladder according to claim 1, wherein the external force is directed substantially parallel to the substantially vertical side of the vehicle.

3. The ladder according to claim 1, wherein the pivotable attachment of the ladder end and the mounting end includes a cam, wherein the cam is combined with a compression spring, wherein the combination of the cam and compression spring provides a hinged mounting bracket that is spring-loaded and automatically centering.

4. A ladder for a vehicle including a substantially vertical side, comprising:
   an upper ladder step;
   means for pivotably-collapsing the upper ladder step flush against the substantially vertical side of the vehicle in response to an external force applied to the upper ladder step;
   a lower ladder step; and
   means for independently moving the lower ladder step relative the pivotably-collapsing movement of the upper ladder step, wherein the means for collapsing includes
   a pair of upper pivot mechanisms, wherein one of each of the pair of upper pivot mechanisms are attached to respective ends of the upper ladder step; and a pair of hinged mounting brackets, wherein each of the hinged mounting brackets includes a ladder end pivotably-attached to a mounting end, wherein the mounting end is fixed to the substantially vertical side of the of the vehicle, wherein each of the ladder ends are pivotably-attached to the pair of upper pivot mechanisms, wherein each of the ladder ends of the pair of hinged mounting brackets are deflectable to the left or right to define a range of motion of about 180° to permit the ladder end of each bracket to lay flush against the substantially vertical side of the vehicle.

5. The ladder according to claim 4, wherein the external force is directed substantially parallel to the substantially vertical side of the vehicle.

6. The ladder according to claim 4, wherein the means for independently moving includes a pair of flexible straps including a lower terminal end, wherein each of the flexible straps are attached to each of the ladder ends of the pair of hinged brackets; and a pair of lower pivot mechanisms, wherein each of the lower pivot mechanisms are attached to the lower terminal end of each of the flexible traps, wherein one of each of the pair of lower pivot mechanisms are attached to respective ends of the lower ladder step.

7. The ladder according to claim 6, wherein the pair of flexible straps includes reinforced rubber material.

8. The ladder according to claim 6, wherein the pair of flexible straps includes a metal belt material.

9. The ladder according to claim 4, wherein the pivotable attachment of the ladder end and the mounting end includes a cam, wherein the cam is combined with a compression spring, wherein the combination of the cam and compression spring provides a hinged mounting bracket that is spring-loaded and automatically centering.

* * * * *